United States Patent
Hatch

(10) Patent No.: US 6,685,840 B2
(45) Date of Patent: Feb. 3, 2004

(54) METHOD FOR DETERMINING THE DISSOLUTION RATE OF A SOLID WATER TREATMENT PRODUCT

(75) Inventor: Steven R. Hatch, Naperville, IL (US)

(73) Assignee: Ondeo Nalco Company, Naperville, IL (US)

( * ) Notice: Subject to any disclaimer, the term of this patent is extended or adjusted under 35 U.S.C. 154(b) by 0 days.

(21) Appl. No.: 10/066,168

(22) Filed: Jan. 31, 2002

(65) Prior Publication Data

US 2003/0141258 A1 Jul. 31, 2003

(51) Int. Cl.$^7$ ................................................. C02F 1/00
(52) U.S. Cl. ........................ 210/739; 210/749; 210/85
(58) Field of Search ............................... 210/739, 749, 210/85

(56) References Cited

U.S. PATENT DOCUMENTS

| | | | |
|---|---|---|---|
| 4,783,314 A | | 11/1988 | Hoots et al. |
| 4,992,380 A | | 2/1991 | Moriarty et al. |
| 5,041,386 A | | 8/1991 | Pierce et al. |
| 5,433,867 A | * | 7/1995 | Kisner |
| 5,650,563 A | * | 7/1997 | Cooper et al. |
| 5,741,433 A | | 4/1998 | Mitchell et al. |
| 6,010,639 A | | 1/2000 | Mitchell et al. |
| 6,315,909 B1 | * | 11/2001 | Hoots et al. |
| 6,447,722 B1 | * | 9/2002 | Rakestraw |

OTHER PUBLICATIONS

NALCO® CUPROSE/402 Product Brochure, Nalco Chemical Company, Jul. 1978.
NALCO® 37/437/8320 Product Brochure, Nalco Chemical Company, Jul. 1978.
NALCO® 26W/426W Product Brochure, Nalco Chemical Company, Jul. 1978.
NALCO® 39 Product Brochure, Nalco Chemical Company, Jul. 1978.
NALCO® 82/482 Product Brochure, Nalco Chemical Company, Jul. 1978.
NALCO® 206 and NALCO® 207 Product Brochure, Nalco Chemical Company, Jul. 1978.
NALCO® 296/496 Product Brochure, Nalco Chemical Company, Jul. 1978.
NALCO® 310/410/7314 Product Brochure, Nalco Chemical Company, Jul. 1978.
NALCO® 330 and NALCO® 331 Product Brochure, Nalco Chemical Company, Jul. 1978.
NALCO® 360 Product Brochure, Nalco Chemical Company, Dec. 1979.
NALCO® 385 Product Brochure, Nalco Chemical Company., Jul. 1978.
NALCO® 519 and NALCO® 918/418 Product Brochure, Nalco Chemical Company, Jul. 1978.
NALCO® 936, NALCO® 937 and NALCO® 7397/8397 Product Brochure, Nalco Chemical Company, Jul. 1978.
NALC® 7324 Product Brochure, Nalco Chemical Company, Jul. 1978.
NALCO® 7340/8375 Product Brochure, Nalco Chemical Company, Jul. 1978.
NALCO® 8331 Product Brochure, Nalco Chemical Company, Jan. 1983.
NALCO® 8343 Product Brochure, Nalco Chemical Company, Nov. 1981.
NALCO® 8345 Product Brochure, Nalco Chemical Company, Nov. 1981.
NALCO® CUPROSE ALGICIDE Product Brochure, Nalco Chemical Company, Dec.1973.
NALCO® 37 Corrosion Inhibitor Product Brochure, Nalco Chemical Company, Aug. 1981.
Nalco® 296 Water Stabilizing Treatment Produt Brochure, Nalco Chemical Company, Nov. 1981.
NALPREP® 331 Corrosion Inhibitor Product Brochure, Nalco Chemical Company, Mar. 1982.
NALCO® 352 Condensate Corrosion Inhibitor Product Brochure, Nalco Chemical Company, Nov. 1987.
NALCO® 353 Condensate Corrosion Inhibitor Product Brochure, Nalco Chemical Company, Nov. 1987.
NALCO® 354 Condensate Corrision Inhibitor Product Brochure, Nalco Chemical Company, Nov. 1987.
NALCO® 356 Condensate Corrosion Inhibitor Product Brochure, Nalco Chemical Company, Nov. 1987.
NALCO® 357 Condensate Corrosion Inhibitor Product Brochure, Nalco Chemical Company, Nov. 1987.
NALCO® 7270 Condensate Corrosion Inhibitor Product Brochure, Nalco Chemical Company, Nov. 1987.
NALCO® 7271 Condensate Corrosion Inhibitor Product Brochure, Nalco Chemical Company, Nov. 1987.
NALCO® 7274 Condensate Corrosion Inhibitor Product Brochure, Nalco Chemical Company, Nov. 1987.
NALCO® 360 Corrosion Inhibitor Product Brochure, Nalco Chemical Company, Oct. 1978.
NALCO® 439–L Corrosion Inhibitor Product Brochure, Nalco Chemical Company, Feb. 1979.

(List continued on next page.)

*Primary Examiner*—Betsey Morrison Hoey
(74) *Attorney, Agent, or Firm*—Margaret M. Brumm; Thomas M. Breininger

(57) ABSTRACT

A method of making a solid water treatment product with an optimal rate of dissolution is described and claimed. A fluorescent tracer is used to determine the rate of dissolution of the solid water treatment product and the composition and method of manufacturing the solid water treatment product are adjusted as needed to make the rate of dissolution optimal. The solid water treatment product can be used in many industrial water treatment systems. When the solid water treatment product is used, the amount of solid water treatment product present in the water of the industrial water system can be determined, and adjusted, by using a fluorometer to measure the fluorescent signal of the fluorescent tracer present in the product and relating that measurement to the amount of product in the water itself.

9 Claims, No Drawings

OTHER PUBLICATIONS

NALCO® 918 Water Stabilizing Treatment Product Brochure, Nalco Chemical Company, Dec. 1982.

NALCO® 936 Scale and Corrosion UInhibitor Product Brochure, Nalco Chemical Company, Sep. 1980.

NALCO® 937 Cooling Water Treatment Product Brochure, Nalco Chemical Company, Jan. 1982.

Super Zinc® 1360 Utilities Newsletter, Nalco Chemical Company, Jan. 1988, © 1987.

NALCO® 2550 Boiler Feedwater Treatment Product Brochure, Nalco Chemical Company, Nov.1987.

NALCO® 2580 Boiler Feedwater Treatment Product Brochure, Nalco Chemical Company, Apr. 1987.

NALCO® 2823 Boiler Feedwater Treatment Product Brochure, Nalco Chemical Company, Nov. 1987.

NALCO® 7313 Liquid Cooling Water Dispersant Product Brochure, Nalco Chemical Company, Oct. 1980.

NALCO® 7320 Microorganism Control Chemical Product Brochure, Nalco Chemical Company, Sep. 1984.

NALCO® 7324 Microorganism Control Chemical Product Brochure, Nalco Chemical Company, Jun. 1976.

NALCO® 7343 Microorganism Control Chemical Product Brochure, Nalco Chemical Company, Jul. 1985.

NALCO® 7343–Tab Microorganism Control Mechanism Chemical Product Brochure, Nalco Chemical Company, Sep. 1988.

NALCO® 8331 Closed System Treatment Product Brochure, Nalco Chemical Company, Jan. 1983.

NALCO® 8334 Closed System Treatment Product Brochure, Nalco Chemical Company, Aug. 1977.

Nalco® 8343 Iron Conditioning Agent Product Brochure, Nalco Chemical Company, Nov. 1981.

NALCO® 8345 Iron Removal Agent Product Brochure, Nalco Chemical Company, Jan. 1983.

* cited by examiner

METHOD FOR DETERMINING THE DISSOLUTION RATE OF A SOLID WATER TREATMENT PRODUCT

FIELD OF INVENTION

This invention is in the field of water treatment products. Specifically, this invention is in the field of water treatment products for use in industrial water systems.

BACKGROUND OF THE INVENTION

Industrial water systems exist so that necessary chemical, mechanical and biological processes can be conducted to reach the desired outcome. Industrial water systems include the following: cooling water systems, including open recirculating, closed and once-through cooling tower water systems; boilers and boiler water systems; petroleum wells, downhole formations, geothermal wells and other oil field applications; mineral process waters including mineral washing, flotation and benefaction; paper mill digesters, washers, bleach plants and white water systems; black liquor evaporators in the pulp industry; gas scrubbers and air washers; continuous casting processes in the metallurgical industry; air conditioning and refrigeration systems; industrial and petroleum process water; indirect contact cooling and heating water, such as pasteurization water; water reclamation and purification systems; membrane filtration water systems; food processing streams (meat, vegetable, sugar beets, sugar cane, grain, poultry, fruit and soybean); and waste treatment systems as well as in clarifiers, liquid-solid applications, municipal sewage treatment and industrial or municipal water systems.

An example of one ubiquitous type of industrial water system is a cooling water system; wherein the cooling water system comprises a cooling tower, heat exchangers, pumps and all necessary piping to move water through the system. Control of a cooling water system is based on balancing the desire to operate the system at the highest concentration cycles possible without incurring detrimental scaling, corrosion, fouling, or microbiological control patterns.

As is the case with many industrial water systems, many cooling water systems use treatment products to control undesirable phenomena such as scaling, corrosion, fouling and microbiological growth. These treatment products include chemical materials such as polymers, phosphates, phosphonates, azoles, zinc, molybdate, biocides, and other materials and are known to people of ordinary skill in the art of cooling water systems.

Treatment products are typically prepared by taking these chemical materials and formulating them into aqueous liquid phase products for distribution to and delivery into a cooling water system. Delivery into a cooling water system can be accomplished by pump feed or edductor feed system or even by manual addition of the treatment product. A cooling water system can be set up to feed treatment product based on either a bleed/feed mechanism where the action of blowdown triggers a chemical feed pump or valve that feeds treatment product; or, in the alternative, the cooling water system feeds treatment product based on timers using a "feeding schedule" or flow meters on the make-up water line trigger the pumping of treatment product based on a certain amount of make-up water being pumped. A limitation of these control methods is that none of these systems measure the treatment product concentration directly online, so if there is a mechanical problem, for example, if a pump fails, a drum empties, or high, low or unknown blowdown occurs, system volume changes or makeup water quality changes; the correct treatment product concentration is not maintained. Because this problem is common, cooling tower systems are typically either overfed with treatment product to ensure the level of treatment product in the system does not drop too low as a result of high variability in product dosage or the treatment product is unknowingly underfed. Both overfeeding and underfeeding of treatment product are undesirable due to cost and performance drawbacks.

One aspect of known control schemes is addition of an inert fluorescent chemical tracer in a known proportion to the active component of the treatment product and feeding this mixture of treatment product and tracer to the cooling water system. Then a fluorometer is used to monitor the fluorescent signal of the inert fluorescent chemical. This technology is commercially available as TRASAR®, which is a registered trademark of Ondeo Nalco Company, Ondeo Nalco Center, 1601 W. Diehl Road, Naperville Ill. 60563, ((630) 305-1000). The fluorescent signal of the inert fluorescent chemical is used to determine how much inert fluorescent tracer is present, and by knowing the amount of inert fluorescent tracer that is present it is possible to determine the amount of treatment product that is present in the cooling tower. If the amount of treatment product that is present is not what is desired then the feed rate of treatment product can be adjusted to provide the desired amount of treatment product.

As water evaporates from a cooling tower, the concentration of undesirable species in the tower increases. Control methods, such as the water conductivity in the tower, may be used to initiate release of water from the tower, in a process known as blowdown. To maintain a constant water volume, additional water having a lower concentration of undesirable species is added to the tower, in a process known as makeup. Blowdown also reduces the amount of inert tracer and treatment chemicals in the system. Decreasing the amount of inert tracer in the system, decreases the fluorescent signal from the inert tracer. When the fluorescent signal from tracer decreases, the tracer control system is set up to feed a fresh mixture of treatment product and inert tracer chemical to compensate for the decrease in inert fluorescent tracer and treatment chemical that was lost in the blowdown.

Another known method of control of product feed to a cooling water system involves the use of another aspect of tracer technology. This involves using a treatment product containing a molecule or polymer that is either inherently fluorescent or that has been "tagged" with a fluorescent moiety. In contrast to the earlier described inert fluorescent tracers, these fluorescent moieties, are not inert, rather, they are supposed to be consumed as they function to treat whatever performance-related condition it is that they are designed to treat. Thus, by measuring the fluorescent signal of the tagged treatment moiety it is possible to determine the amount of consumption of the tagged treatment moiety. By knowing the amount of consumption of the tagged treatment polymer it is possible to use that information to control the feeding of new treatment product containing tagged treatment moieties.

Liquid phase treatment programs have been favored for cooling water treatment because of their relative ease of delivery into a cooling water system and advantages associated with formulating variations of products. Active components can be formulated in the liquid phase and combined with other active components relatively easily. These same advantages of liquid phase product delivery may be offset by other disadvantages associated with delivery and formulation. For example, pump failure due to air lock, loss of prime, or other mechanical reason can lead to insufficient product delivery into a cooling water system. Liquid phase product combinations and concentrations can be limited by inherent raw material incompatibilities such as acid/base behavior or pH dependent solubility. Some combinations of raw materials simply cannot be combined into a desired product formulation. Furthermore, liquid phase products may become unstable with time and temperature, often leading to undesired product component segregation in delivery containers, or worse, sediment and precipitate buildup in delivery tanks and lines. Some formulations are susceptible to microbiological attack and measures must be taken to preclude microbiological growth in a product. These failures can lead to insufficient or undesirable component delivery to the cooling tower system.

One way of circumventing the disadvantages associated with liquid phase product delivery is to deliver products in solid or dry phase into a cooling system. There are certain water treatment products that have been supplied previously in a solid form. These solid materials were typically composed of chromate and other ingredients and were found to be effective scale and corrosion inhibitors in cooling water systems even with no concentration control. Treatment programs using solid "chromate-containing" treatment products were found to be effective even when the solids did not dissolve completely or dissolved at non-optimum rates. The primary success of these products was due to the effectiveness of chromate as a corrosion inhibitor. Environmental and health regulations now prohibit the use of chromate in cooling water treatment systems in most regions and liquid phase treatment programs evolved to meet the changing market needs.

Further limitations on the successful use of solid water treatment products is that use of a solid water treatment product requires that all active water treatment chemicals present in the water treatment product be delivered into the water of an industrial water system in the desired fractions or concentrations within a desired time frame. This delivery of active materials depends upon the dissolution rate of the solid treatment product in the water of an industrial water system.

It would therefore be desirable to have the ability to provide a solid water treatment product with an optimal dissolution rate.

SUMMARY OF THE INVENTION

The first aspect of the instant claimed invention is a method of making a solid water treatment product with an optimal dissolution rate, comprising the steps of:

1) providing the ingredients to make a solid water treatment product, wherein said ingredients are selected from the group comprising:
   a) Active Ingredients;
   b) Optional Inactive Ingredients; and
   c) Fluorescent Tracer, wherein said Fluorescent Tracer is selected from the group consisting of inert fluorescent tracers and active fluorescent tracers;
wherein said solid water treatment product consists essentially of from about 10% to about 99.99% of said Active Ingredients, from about 0% to about 98% of said Optional Inactive Ingredients and from about 0.01% to about 10% of said Fluorescent Tracer;

2) preparing the solid water treatment product;
3) placing the solid water treatment product in test water;
4) providing a fluorometer;
5) using said fluorometer to measure the fluorescent signal of said fluorescent tracer in said test water;

6) repeating the measurement of fluorescent signal from Step 5) at regular intervals;

7) determining the rate of dissolution of solid water treatment product by analyzing the increase in fluorescent signal measured in Step 5) with time; wherein if said rate of dissolution of solid water treatment product is optimal, then Steps 8) and 9) are optional, and if said rate of dissolution of solid water treatment product is not optimal, then Steps 8) and 9) are required;

8) optionally adjusting the preparation of said solid water treatment product, based on the rate of dissolution determined in Step 7), in order to prepare a solid water treatment product with an optimal dissolution rate; and 9) optionally repeating Steps 3), 4), 5), 6), 7) and 8) as necessary in order to obtain a solid water treatment product with an optimal dissolution rate.

The second aspect of the instant claimed invention is a method of treating the water in an industrial water system with a solid water treatment product wherein said solid water treatment product has an optimal rate of dissolution, comprising the steps of:

a) providing an industrial water system;
b) providing a solid water treatment product, wherein said solid water treatment product has an optimal rate of dissolution;
c) adding from about 1 ppb to about 10,000 ppm of said solid water treatment product, wherein said solid water treatment product has an optimal rate of dissolution, to the water in said industrial water system;
d) allowing said solid water treatment product to dissolve and treat the water in said industrial water system.

The third aspect of the instant claimed invention is a method of controlling the amount of solid water treatment product present in an industrial water system, wherein said solid water treatment product has an optimal rate of dissolution, comprising the steps of:

a) providing an industrial water system;
b) providing a solid water treatment product, wherein said solid water treatment product has an optimal rate of dissolution, wherein said solid water treatment product comprises a fluorescent tracer;
c) adding from about 1 ppb to about 10,000 ppm of said solid water treatment product, wherein said solid water treatment product has an optimal rate of dissolution, to the water in said industrial water system;
d) allowing said solid water treatment product to dissolve and treat the water in said industrial water system;
e) providing a fluorometer;
f) using said fluorometer to measure the fluorescent signal of said fluorescent tracer;
g) correlating said fluorescent signal of said fluorescent tracer with the amount of fluorescent tracer present in the water of said industrial water system;
h) correlating the amount of fluorescent tracer present in the water of said industrial water system with the amount of water treatment product present in said industrial water system;
i) comparing the amount of water treatment product present in the water of said industrial water system with the amount of water treatment product that is optimally present;
j) adjusting the feedrate of solid water treatment product to the water of said industrial water system such that the amount of water treatment product present in the water of said industrial water system is optimal.

DETAILED DESCRIPTION OF THE INVENTION

Throughout this patent application the following terms have the indicated definitions:

"aka" means "also known as".

Aldrich refers to Aldrich, P.O. Box 355, Milwaukee, Wis. 53201 USA, telephone number (800) 558-9160.

Nalco refers to Ondeo Nalco Company, Ondeo Nalco Center, 1601 W. Diehl Road, to Naperville Ill. 60563, telephone number (630) 305-1000.

The first aspect of the instant claimed invention is a method of making a solid water treatment product with an optimal dissolution rate, comprising the steps of:

1) providing the ingredients to make a solid water treatment product, wherein said ingredients are selected from the group comprising:
   a) Active Ingredients;
   b) Optional Inactive Ingredients; and
   c) Fluorescent Tracer, wherein said Fluorescent Tracer is selected from the group consisting of inert fluorescent tracers and active fluorescent tracers;

wherein said solid water treatment product consists essentially of from about 10% to about 99.99% of said Active Ingredients, from about 0% to about 98% of said Optional Inactive Ingredients and from about 0.01% to about 10% of said Fluorescent Tracer;

2) preparing the solid water treatment product;
3) placing the solid water treatment product in test water;
4) providing a fluorometer;
5) using said fluorometer to measure the fluorescent signal of said fluorescent tracer in said test water;
6) repeating the measurement of fluorescent signal from Step 5) at regular intervals;
7) determining the rate of dissolution of solid water treatment product by analyzing the increase in fluorescent signal measured in Step 5) with time; wherein if said rate of dissolution of solid water treatment product is optimal, then Steps 8) and 9) are optional, if said rate of dissolution of solid water treatment product is not optimal, then Steps 8) and 9) are required;
8) optionally adjusting the preparation of said solid water treatment product, based on the rate of dissolution determined in Step 7), in order to prepare a solid water treatment product with an optimal dissolution rate;
9) optionally repeating Steps 3), 4), 5), 6), 7) and 8) as necessary in order to obtain a solid water treatment product with an optimal dissolution rate.

The first step in the process is to provide the ingredients to make a solid water treatment product. Of course the ingredients that are required depend upon the solid water treatment product being made. For instance, water treatment products suitable for use in cooling water can be divided into several categories, molybdate-phosphonate, alkaline-zinc, stabilized phosphate, all-organic, dispersants, and biocides. For all categories of treatment products for use in industrial water systems, it is already known whether the ingredients can be obtained in a solid physical form.

Some representative solid product formulations are listed below. Formulas are presented on a weight % of raw materials basis. Formulas 1–10 are representative of formulations useful as treatment products for Cooling water systems, however, it is understood that some of these formulations, particularly 1, 2, 7, and 8 could also be used as treatment products in Hot Water Boilers and Low Pressure Boilers. Formulas 11–13 are representative of formulations useful as treatment products for Boilers.

Active ingredients present in these solid water treatment products are designated with an "A". Inactive Ingredients present in these solid water treatment products are designated with an "I". The fluorescent tracer present in these solid water treatment products is designated with a "FT".

| | Formulation 1-an "All-Organic" scale inhibitor providing some corrosion inhibition | |
|---|---|---|
| 27.6% | benzotriazole | A |
| 70.4% | 1-hydroxyethylidene-1,1-diphosphonic acid | A |
| 2% | 1,3,6,8-pyrenetetrasulfonic acid, sodium salt | FT |
| | Formulation 2-an "alkaline phosphate" corrosion inhibitor providing some scale inhibition | |
| 1.9% | benzotriazole | A |
| 48.2% | phosphinosuccinic oligomer | A |
| 8.4% | sodium hexametaphosphate | A |
| 39.5% | amine substituted sulfomethylated acrylamide acrylate terpolymer | A |
| 2.0% | 1,3,6,8-pyrenetetrasulfonic acid sodium salt | FT |
| | Formulation 3-a dispersant package | |
| 98% | amine substituted sulfomethylated acrylamide acrylate terpolymer | A |
| 2% | 1,3,6,8-pyrenetetrasulfonice acid sodium salt | FT |
| | Formulation 4 | |
| 1% to 99% | Resazurin, sodium salt | FT |
| 99% to 1% | 1-hydroxyethylidene-1,1-diphosphonic acid | A |
| 2% to 98% | inert excipient such as sodium chloride | I |
| | Formulation 5 | |
| 1% to 99% | Resazurin, sodium salt | FT |
| 99% to 1% | 2,2-dibromo-3-nitrilopropionamide | A |
| 2% to 98% | inert excipient such as sodium chloride | I |
| | Formulation 6-a "zinc-phosphate" corrosion inhibitor | |
| 10.2% | zinc chloride | A |
| 15.3% | phosphinosuccinic oligomer | A |
| 35.7% | sodium phosphate | A |
| 35.7% | amine substituted sulfomethylated acrylamide acrylate terpolymer | A |
| 2.6% | benzotriazole | A |
| 0.5% | 1,3,6,8-pyrenetetrasulfonic acid sodium salt | FT |
| | Formulation 7-an alkaline phosphate corrosion inhibitor | |
| 36.2% | sodium phosphate | A |
| 9.3% | phosphinosuccinic oligomer | A |
| 23.3% | amine substituted sulfomethylated acrylamide acrylate terpolymer | A |
| 4.7% | benzotriazole | A |
| 0.3% | 1,3,6,8-pyrenetetrasulfonic acid sodium salt | FT |
| | Formulation 8-a molybdate phosphonate scale/corrosion control product | |
| 25.2% | amine substituted sulfomethylated acrylamide acrylate terpolymer | A |
| 16.5% | benzotriazole | A |
| 38.9% | 1-hydroxyethylidene-1,1-diphosphonic acid (59.2% actives) | A |
| 18.9% | sodium molybdate dihydrate | A |
| 0.5% | 1,3,6,8-pyrene tetra sulfonic acid, sodium salt | FT |
| | Formulation 9-An alkaline scale/corrosion control product for when there is phosphate in the make-up water. | |
| 18.9% | phosphinosuccinic oligomer | A |
| 75.4% | amine substituted sulfomethylated acrylamide acrylate terpolymer | A |
| 4.7% | benzotriazole | A |
| 1.0% | 1,3,6,8-pyrenetetrasulfonic acid sodium salt | FT |

-continued

Formulation 10-a biocide

| | | |
|---|---|---|
| 99% | 2,2-dibromo-3-nitrilopropionamide | A |
| 1% | 1,3,6,8-pyrenetetrasulfonic acid sodium salt | FT |

Formulation 11-a "phosphate residual program with scavenger and polymer" boiler treatment product

| | | |
|---|---|---|
| 15% | sodium hexametaphosphate | A |
| 15% | polyacrylate | A |
| 15% | sodium sulfite | A |
| 1% | cobalt salt | A |
| 5% | sodium hydroxide | A |
| 48% | binder material | I |
| 1% | fluorescein | FT |

Formulation 12-an all-polymer with scavenger boiler treatment product

| | | |
|---|---|---|
| 25% | polyacrylate | A |
| 15% | sodium sulfite | A |
| 1% | cobalt salt | A |
| 5% | sodium hydroxide | A |
| 53% | binder | I |
| 1% | fluorescein | FT |

Formulation 13-a boiler coagulation program

| | | |
|---|---|---|
| 40% | soda ash | A |
| 10% | sodium hexametaphosphate | A |
| 20% | disodium phosphate | A |
| 15% | lignosulfonate | A |
| 10% | sodium sulfite | A |
| 1% | cobalt salt | A |
| 3% | binder | I |
| 1% | fluorescein | FT |

Throughout these formulations it is to be understood that substitutions of products with similar functionalities is possible. For example, the benzotriazole present as a "yellow metal corrosion inhibitor" in several formulations could be replaced with another "triazole" with similar functionality such as tolyltriazole and halogenated tolyltriazole.

The 1-hydroxyethylidene-1,1-diphosphonic acid present as a "scale inhibitor" in several formulations could be replaced with another "phosphonic acid" with similar functionality such as 2-phosphonobutane-1,2,4-tricarboxylic acid and aminotrimethylene phosphonate.

The phosphinosuccinic oligomer present as a "corrosion inhibitor" in several formulations could be replaced with another "phosphinosuccinic acid corrosion inhibitor" with similar functionality such as Bricorr 288, available from Rhodia, Inc., 259 Prospect Plains Rd., Conn. 7500, Cranbury, N.J. 08512-7500 (609) 860-4000; and Belcor 575, available from Great Lakes Chemical Corp., 500 E. 96$^{th}$ St. Suite 500, Indianapolis, Ind. 46240 (317) 715-3000.

The sodium hexametaphosphate present as a "corrosion inhibitor, alkalinity source or scale control agent" in several formulations could be replaced with another "molecularly dehydrated phosphate" with similar functionality such as sodium tripolyphosphate.

The "amine substituted sulfomethylated acrylamide acrylate terpolymer" present as a dispersant in several formulations could be replace by another "polymer" with similar functionality such as polyacrylate, sulfonated styrene maleic anhydride, sulfomethylated acrylamide acrylate terpolymer.

The Resazurin present as a Fluorescent Tracer in two formulations could be replaced by another reactive fluorogenic dye with similar functionality such as the acetic acid ester of pyrene 3,6,8-trisulfonic acid; carboxyfluorescein diacetate; 3-carboxyumbelliferyl β-D-galactopyranoside; 3-carboxyumbelliferyl β-D-glucuronide; 9H-(1,3-dichloro-9,0-dimethylacridine-2-one-7-yl), D-glucuronide; 9H-(1,3-dichloro-9,9-dimethylacridin-2-one-7-yl); Resorufin β-D-galactopyranoside; fluorescein di-β-D-galactopyranoside; fluorescein di-β-D-glucuronide; Resorufin β-D-glucuronide; fluorescein diphosphate; methylene blue; 4-methylumbelliferyl phosphate; 4-methylumbelliferyl β-D-glucuronide; pyranine phosphate; and pyrene 3,6,8-trisulfonic acid 1-phosphate.

The sodium chloride, functioning as an inert excipient, could be replaced by other inert excipients such as polyethylene glycol, sodium silicate and other known carbonate salts.

The sodium phosphate, functioning as a corrosion inhibitor, could be replaced by other compounds with the same functionality such as sodium tripolyphosphate.

The polyacrylate, functioning as a scale inhibitor, could be replaced by other compounds with the same functionality such as methacrylate polymers and acrylate/styrene sulfonate polymers.

The sodium sulfite, functioning as a scavenger, could be replaced by other compounds with the same functionality such as carbohydrazide, erythorbic acid, gallic acid and sodium bisulfite. Sodium sulfite can also function as a corrosion inhibitor; in which case, it could be replaced by other compounds with the same functionality such as hydroquinone or other solid reducing agents.

The cobalt salt, functioning as a catalyst, could be replaced by other compounds with the same functionality such as other metal salts such as copper salts and iron salts.

The sodium hydroxide, functioning as a pH adjuster(an alkalinity source), could be replaced by other compounds with the same functionality such as potassium hydroxide.

The binder material is selected from the group consisting of starch and other known inert materials with "inert material" being defined as those materials that will dissolve in the water of the system without deleterious effects.

The disodium phosphate, functioning as a corrosion inhibitor, alkalinity source or scale control agent could be replaced by other compounds with the same functionality such as phosphate salts such as trisodium phosphate and monosodium phosphate.

Soda ash functions as an alkalinity source.

The lignosulfonate, functioning as a dispersant, could be replaced by other compounds with the same functionality such as any acrylate polymer that can be taken to dryness or lignin.

Fluorescent Tracers that are available in a solid form include the following 1,3,6,8-pyrenetetrasulfonic acid sodium salt, fluorescein, molybdate, vanadate and naphthalene disulfonic acid, sodium salt. Preferred Fluorescent Tracers for use in solid water treatment products are 1,3,6,8-pyrenetetrasulfonic acid, sodium salt and fluorescein.

All of these Active, Inactive and Fluorescent Tracer compounds are either commercially available from Aldrich or if they are not commercially available, they are capable of being synthesized using procedures reported in the literature.

In preparing these solid water treatment products all techniques known to people with skill in the art of solids product preparation can be used. These include, but are not limited to: grinding to powder, pelletizing, briqueting, encapsulating, slurrying and gelation. The preferred form of the solid water treatment product is pellets with a particle size of about half an inch. The preferred size of the pellets is dependent on the volume of water in the industrial water system for which the pellet is intended. Pellet size is a parameter that can be varied during the manufacturing process to ensure that the pellet dissolution rate and size are commensurate with the industrial water system being treated such that an optimal product concentration is maintained in the cooling water system. The optimum dissolution rate is determined based on the general concept that it is desirable for pellets to completely dissolve prior to addition of subsequent pellets to the water so that a relatively constant product concentration is maintained in the water of the industrial water system. Addition of a fluorescent tracer to the product allows the determination of this balance of size and dissolution rate.

In making the solid water treatment product, the Fluorescent tracer can be preblended with the other ingredients to make a homogeneous solid water treatment product or the Fluorescent Tracer can be placed at the center of the solid water treatment product such that it ends up being coated with the other ingredients.

After the solid water treatment product has been formed it must be tested to determine its dissolution rate in water. Test water that is formulated to closely match the type of water found in the industrial water system of interest is provided. For example, "standard" test water for cooling water in a cooling tower typically has the following features: 60 ppm $Ca^{2+}$, 18 ppm $Mg^{2+}$, 134 ppm $HCO_3^-$, 53 ppm $Cl^-$ and 72 ppm $SO_4^{2-}$. A typical scale formation test for a model or simulation boiler typically has these concentrations of scaling contaminants in the boiler water; 10 ppm Calcium as $CaCO_3$, 5 ppm Magnesium as $CaCO_3$, 5 ppm silica as $SiO_2$. Alkalinity such as caustic (NaOH) is added in sufficient quantity to maintain a pH of typically between 10.0 and 11.0 in the boiler water.

In order to determine the dissolution rate of the solid water treatment product the solid water treatment product is placed in the test water and allowed to dissolve. A fluorometer is provided and the fluorescent signal of the Fluorescent Tracer present in the solid water treatment product is measured using the fluorometer. The fluorescent signal is measured at regular intervals.

Fluorometers suitable for use in the instant claimed invention are available from Nalco. The preferred fluorometer is a TRASAR® 3000 unit.

How to set up and program a fluorometer and use it to measure the fluorescent signal of a Fluorescent Tracer is known to people of ordinary skill in the art of fluorometry.

After the rate of dissolution for the solid water treatment product has been determined, the rate is compared to the optimal rate of dissolution for the solid water treatment product. The optimal rate of dissolution is typically dependent upon the solid water treatment product and the industrial water system it is being used in and is known to people of ordinary skill in the art. If the measured dissolution rate matches the optimal dissolution rate for the solid water treatment product than the dissolution rate of the solid water treatment product does not need to be changed.

If the measured dissolution rate is either too rapid, or not rapid enough to match the optimal dissolution rate for that solid water treatment product, the solid water treatment product can then be reformulated. After the solid water treatment product has been reformulated, its dissolution rate can be determined using the method of the instant claimed invention.

The reformulation of the solid water treatment product can continue until the dissolution rate of the solid water treatment product is optimal.

The second aspect of the instant claimed invention is a method of treating the water in an industrial water system with a solid water treatment product wherein said solid water treatment product has an optimal rate of dissolution, comprising the steps of:

a) providing an industrial water system;
b) providing a solid water treatment product, wherein said solid water treatment product has an optimal rate of dissolution;
c) adding from about 1 ppb to about 10,000 ppm of said solid water treatment product, wherein said solid water treatment product has an optimal rate of dissolution, to the water in said industrial water system;
d) allowing said solid water treatment product to dissolve and treat the water in said industrial water system.

Industrial water systems capable of being treated by solid water treatment products include cooling tower water systems (including open recirculating, closed and once-through cooling tower water systems); petroleum wells, downhole formations, geothermal wells and other oil field applications; boilers and boiler water systems; mineral process waters including mineral washing, flotation and benefaction; paper mill digesters, washers, bleach plants and white water systems; black liquor evaporators in the pulp industry; gas scrubbers and air washers; continuous casting processes in the metallurgical industry; air conditioning and refrigeration systems; industrial and petroleum process water; indirect contact cooling and heating water, such as pasteurization water; water reclamation and purification systems; membrane filtration water systems; food processing streams (meat, vegetable, sugar beets, sugar cane, grain, poultry, fruit and soybean); and waste treatment systems as well as in clarifiers, liquid-solid applications, municipal sewage treatment and industrial or municipal water systems.

The preferred amount of solid water treatment product added to the water of said industrial water system is from about 1 ppb to about 10,000 ppm. The more preferred amount of solid water treatment product added to the water of said industrial water system is from about 10 ppb to about 1000 ppm. The most preferred amount of solid water treatment product added to the water of said industrial water system is from about 1 ppm to about 300 ppm.

The method of addition of the solid water treatment product to the water of the industrial water system depends upon what industrial water system is being treated and the solid water treatment product selected. Gravity feed of the solid water treatment product is usually the preferred method but gravity feed can be supplement by airveying, conveyor belts, screw-driving and worm-driving.

The third aspect of the instant claimed invention is a method of controlling the amount of solid water treatment product present in an industrial water system, wherein said solid water treatment product has an optimal rate of dissolution, comprising the steps of:

a) providing an industrial water system;
b) providing a solid water treatment product, wherein said solid water treatment product has an optimal rate of dissolution, wherein said solid water treatment product comprises a fluorescent tracer;
c) adding from about 1 ppb to about 10,000 ppm of said solid water treatment product, wherein said solid water treatment product has an optimal rate of dissolution, to the water in said industrial water system;
d) allowing said solid water treatment product to dissolve and treat the water in said industrial water system;
e) providing a fluorometer;
f) using said fluorometer to measure the fluorescent signal of said fluorescent tracer;
g) correlating said fluorescent signal of said fluorescent tracer with the amount of fluorescent tracer present in the water of said industrial water system;
h) correlating the amount of fluorescent tracer present in the water of said industrial water system with the amount of water treatment product present in said industrial water system;

i) comparing the amount of water treatment product present in the water of said industrial water system with the amount of water treatment product that is optimally present;

j) adjusting the feedrate of solid water treatment product to the water of said industrial water system such that the amount of water treatment product present in the water of said industrial water system is optimal.

The following examples are presented to be illustrative of the present invention and to teach one of ordinary skill how to make and use the invention. These examples are not intended to limit the invention or its protection in any way.

EXAMPLES

A tablet of solid cooling water treatment product of Formulation 1, {27.6% benzotriazole, 70.4% 1-hydroxyethylidene-1,1-diphosphonic acid and 2% 1,3,6, 8-pyrenetetrasulfonic acid, sodium salt} is made. The tablet weighs 0.9081 grams. The tablet is placed in standard cooling water {60 ppm $Ca^{2+}$, 18 ppm $Mg^{2+}$, 134 ppm $HCO_3^{31}$, 53 ppm $Cl^{31}$ and 72 ppm $SO_4^{2-}$} and the dissolution rate of each ingredient in the table is measured. The dissolution rate of each ingredient present is measured using analytical techniques suitable for analyzing for each ingredient. The dissolution rate of the benzotriazole (abbreviated "BZT") is measured using fluorometric analytical techniques, known in the art of analyzing triazoles. The dissolution rate of 1-hydroxyethylidene-1,1-diphosphonic acid (abbreviated "HEDP") is measured using standard "colorimetric determination" analytical techniques, known in the art of analyzing for diphosphonic acids. The dissolution rate of the 1,3,6,8-pyrenetetrasulfonic acid, sodium salt (abbreviated "PTSA") is measured using fluorometric analytical techniques.

The results of this test are shown in Table 1 Release rates for each ingredient are given in milligrams ('mg") per minute ("min.").

TABLE I

| Time (minutes) | Release Rate for BZT | Release Rate for HEDP | Release Rate for PTSA |
| --- | --- | --- | --- |
| 0 | * | * | * |
| 1 | * | * | * |
| 5 | 8.75 | 10.5 | 0.5925 |
| 10 | 13.8 | 20 | 0.98 |
| 15 | 11.4 | 11.4 | 0.5 |
| 30 | 2.167 | 0.933 | 0.143 |
| 60 | 0.5 | 1.03 | * |
| 130 | 0.493 | 0.0143 | * |

* value was below detection limits for this moiety

Example 2

The same tablet was made as was made in Example 1, except that this time, the tablet was coated with a polyethylene oxide material with a molecular weight of approximately 15,000 such that the final weight of finished tablet was 1.411 grams. The dissolution rate of the three ingredients in this tablet were determined, using the same analytical techniques as in Example 1.

TABLE II

| Time (minutes) | Release Rate for BZT | Release Rate for HEDP | Release Rate for PTSA |
| --- | --- | --- | --- |
| 0 | * | * | * |
| 5 | * | * | * |
| 15 | * | * | * |
| 30 | * | * | * |
| 40 | 0.2 | 1.2 | 0.052 |
| 50 | 2.6 | 2.55 | 0.121 |
| 61 | 5.545 | 8.091 | 0.33 |
| 75 | 4.393 | 4.893 | 0.190 |
| 110 | 0.829 | 1.7 | 0.0571 |
| 180 | 0.236 | 0.329 | 0.00493 |

* value was below detection limits for this moiety

The release rates for the tablet in Example 2 were delayed relative to the release rates in Example 1. The maximum rate of release has been delayed by approximately 50 minutes and decreased by over 33% from the original release profile. The overall time it took for the tablet to dissolve in Example 2 was 110 minutes, as compared to the overall time it took for the tablet to dissolve in Example 1 of 30 minutes.

It was also verified that the amount of fluorescent tracer added to the tablet has been found to be proportional in both Examples to the rate at which the other two components are dissolving.

The present method has been described in an illustrative manner. Many modifications and variations are possible in light of the above teachings. It is, therefore, to be understood that within the scope of the appended claims the invention may be practiced otherwise than as specifically described.

What is claimed is:

1. A method of making a solid water treatment product, wherein said solid water treatment product has an optimal dissolution rate, comprising the steps of:

1) providing the ingredients to make a solid water treatment product, wherein said ingredients are selected from the group comprising:
   a) Active Ingredients;
   b) Optional Inactive Ingredients; and
   c) Fluorescent Tracer, wherein said Fluorescent Tracer is selected from the group consisting of inert fluorescent tracers and active fluorescent tracers;
wherein said solid water treatment product consists essentially of from about 10% to about 99.99% of said Active Ingredients, from about 0% to about 98% of said Optional Inactive Ingredients and from about 0.01% to about 10% of said Fluorescent Tracer;

2) preparing the solid water treatment product;

3) placing the solid water treatment product in test water;

4) providing a fluorometer;

5) using said fluorometer to measure the fluorescent signal of said fluorescent tracer in said test water;

6) repeating the measurement of fluorescent signal from Step 5) at regular intervals;

7) determining the rate of dissolution of solid water treatment product by analyzing the increase in fluorescent signal measured in Step 5) with time; wherein if said rate of dissolution of solid water treatment product is optimal, then Steps 8) and 9) are optional, if said rate of dissolution of solid water treatment product is not optimal, then Steps 8) and 9) are required;

8) optionally adjusting the preparation of said solid water treatment product, based on the rate of dissolution determined in Step 7), in order to prepare a solid water treatment product with an optimal dissolution rate;

9) optionally repeating Steps 3), 4), 5), 6), 7) and 8) as necessary in order to obtain a solid water treatment product with an optimal dissolution rate.

2. The method of claim 1 in which said solid water treatment product is used in an industrial water system, wherein the industrial water system is a cooling water system.

3. The method of claim 1 in which said solid water treatment product is used in an industrial water system, wherein the industrial water system is a boiler.

4. A method of treating the water in an industrial water system with a solid water treatment product wherein said solid water treatment product has an optimal rate of dissolution, comprising the steps of:

a) providing an industrial water system;

b) providing a solid water treatment product, wherein said solid water treatment product has an optimal rate of dissolution;

c) adding from about 1 ppb to about 10,000 ppm of said solid water treatment product, wherein said solid water treatment product has an optimal rate of dissolution, to the water in said industrial water system;

d) allowing said solid water treatment product to dissolve and treat the water in said industrial water system.

5. The method of claim 4 in which said industrial water system is a cooling water system.

6. The method of claim 4 in which said industrial water system is a boiler.

7. A method of controlling the amount of solid water treatment product present in an industrial water system, wherein said solid water treatment product has an optimal rate of dissolution, comprising the steps of:

a) providing an industrial water system;

b) providing a solid water treatment product, wherein said solid water treatment product has an optimal rate of dissolution, wherein said solid water treatment product comprises a fluorescent tracer;

c) adding from about 1 ppb to about 10,000 ppm of said solid water treatment product, wherein said solid water treatment product has an optimal rate of dissolution, to the water in said industrial water system;

d) allowing said solid water treatment product to dissolve and treat the water in said industrial water system;

e) providing a fluorometer;

f) using said fluorometer to measure the fluorescent signal of said fluorescent tracer;

g) correlating said fluorescent signal of said fluorescent tracer with the amount of fluorescent tracer present in the water of said industrial water system;

h) correlating the amount of fluorescent tracer present in the water of said industrial water system with the amount of water treatment product present in said industrial water system;

i) comparing the amount of water treatment product present in the water of said industrial water system with the amount of water treatment product that is optimally present;

j) adjusting the feedrate of solid water treatment product to the water of said industrial water system such that the amount of water treatment product present in the water of said industrial water system is optimal.

8. The method of claim 7 in which said industrial water system is a cooling water system.

9. The method of claim 7 in which said industrial water system is a boiler.

* * * * *